US012718649B2

(12) United States Patent
Cotter et al.

(10) Patent No.: US 12,718,649 B2
(45) Date of Patent: Aug. 25, 2026

(54) AUTOMATED DISPENSER FOR GARMENTS AND OTHER ARTICLES AND ASSOCIATED METHODS

(71) Applicant: Cintas Corporate Services, Inc., Cincinnati, OH (US)

(72) Inventors: Robert F. Cotter, Batavia, OH (US); John Savage, Cincinnati, OH (US); Kenneth L. Waters, Felicity, OH (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 170 days.

(21) Appl. No.: 17/577,145

(22) Filed: Jan. 17, 2022

(65) Prior Publication Data

US 2022/0230503 A1 Jul. 21, 2022

Related U.S. Application Data

(60) Provisional application No. 63/138,582, filed on Jan. 18, 2021.

(51) Int. Cl.
*G07F 11/10* (2006.01)
*G07F 9/02* (2006.01)
(Continued)

(52) U.S. Cl.
CPC .............. *G07F 11/10* (2013.01); *G07F 9/023* (2013.01); *G07F 11/045* (2013.01); *G07F 11/14* (2013.01); *G07F 11/1657* (2020.05)

(58) Field of Classification Search
CPC .... G07F 11/10; G07F 11/1657; G07F 11/045; G07F 11/14; G07F 9/023
(Continued)

(56) References Cited

U.S. PATENT DOCUMENTS 1,256,912 A * 2/1918 Liljenroth .............. H02K 23/02 322/86
2,421,815 A * 6/1947 Porterfield ............. A23N 15/10 198/577
(Continued)

OTHER PUBLICATIONS

International Searching Authority, Search Report and Written Opinion issued in PCT/US2022/012666, mailed Apr. 8, 2022 (15 pages).
(Continued)

*Primary Examiner* — Rakesh Kumar
(74) *Attorney, Agent, or Firm* — FBT Gibbons LLP

(57) ABSTRACT

A dispenser for scrubs or other items is modular and can be configured with a desired number of cells for storing scrubs and dispensing them accordingly. The dispenser includes a main or primary bank of cells with each cell housing an inventory of multiple scrubs for dispensing. The main bank of cells may operate in a standalone manner to dispense scrubs, or additional banks can be added to the main bank for increased inventory capacity. The scrubs are stored in a vertical stack in each cell with the uppermost scrub in the cell being the next scrub in that cell to be dispensed. One or more pickers each translate along a gantry to be selectively positioned above one of the cells for picking to pull the uppermost scrub in the cell and elevate it out of the cell. Multiple pickers may operate simultaneously to pick and dispense multiple scrubs at the same time. Each cell includes a platform supporting the vertical stack of scrubs. Once picked, the scrub is moved by the picker along the gantry to a discharge position in the main bank over a discharge delivery chute.

24 Claims, 11 Drawing Sheets

(51) Int. Cl.
*G07F 11/04* (2006.01)
*G07F 11/14* (2006.01)
*G07F 11/16* (2006.01)

(58) Field of Classification Search
USPC ........................................................ 221/98
See application file for complete search history.

(56) References Cited

U.S. PATENT DOCUMENTS 2,652,154 A * 9/1953 Stevens .................. A47F 1/126 211/59.3
3,901,366 A * 8/1975 Schuller ............. G06Q 20/3433 221/12
4,405,059 A * 9/1983 Kull ........................ G07F 11/30 221/129
4,563,120 A * 1/1986 Josserand ............ B65G 1/1371 414/280
4,858,743 A * 8/1989 Paraskevakos ......... G07F 7/069 414/280
4,896,024 A * 1/1990 Morello .................. G07F 11/62 414/274
4,903,815 A * 2/1990 Hirschfeld .............. G07F 7/069 414/280
5,121,854 A * 6/1992 Trouteaud ................. G07F 9/02 221/21
5,139,384 A * 8/1992 Tuttobene ............... G07F 7/069 414/280
5,143,193 A * 9/1992 Geraci .................... G07F 7/069 414/277
5,240,139 A * 8/1993 Chirnomas ......... G07F 17/0071 221/211
5,385,265 A * 1/1995 Schlamp ............. G07F 17/0092 700/242
5,497,905 A * 3/1996 Vogelpohl ............... G07F 11/30 221/226
5,570,811 A * 11/1996 Wittern, Jr. ............. G07F 11/42 221/242
5,638,985 A 6/1997 Fitzgerald et al.
5,971,205 A * 10/1999 Michaels ................ G07F 11/16 221/241
6,016,291 A * 1/2000 Joos ..................... G11B 27/002 369/30.43
6,056,199 A * 5/2000 Wiklof ................. G06K 7/0004 235/462.46
6,199,720 B1 * 3/2001 Rudick ................... G07F 11/32 221/6
6,223,934 B1 5/2001 Shoenfeld
6,230,932 B1 * 5/2001 Lowing ................. G07F 11/045 221/280
6,330,856 B1 12/2001 Fitzgerald et al.
6,415,953 B1 * 7/2002 O'Brien .................. G07F 11/32 221/196
6,439,500 B1 8/2002 Shoenfeld
6,502,718 B2 1/2003 Fitzgerald et al.
6,550,269 B2 * 4/2003 Rudick ................. A47F 3/0486 362/154
6,604,652 B1 * 8/2003 Trautwein ............... G07F 11/42 221/124
6,682,289 B1 * 1/2004 Credle, Jr. ............ G07F 11/163 221/95
6,690,997 B2 * 2/2004 Rivalto .............. G06Q 10/0835 700/242
6,811,080 B1 * 11/2004 Gold ....................... G11B 27/11
6,826,004 B2 * 11/2004 Albrecht .............. G11B 15/682 369/30.46
7,006,893 B2 * 2/2006 Hart ....................... G16H 15/00 700/235
7,086,560 B2 * 8/2006 Shioya .................. G07F 11/165 221/210
7,159,410 B2 * 1/2007 Chirnomas ........... G07F 11/165 62/250
7,188,766 B2 * 3/2007 Fontijn ............... G06F 3/03549 235/492
7,228,200 B2 * 6/2007 Baker .................... G06Q 20/18 221/133
7,270,268 B2 * 9/2007 Garber .............. G06K 7/10079 235/375
7,392,945 B1 * 7/2008 Philyaw ................ H04L 67/306 235/383
7,474,938 B2 1/2009 Poliner
8,057,756 B2 * 11/2011 Londo ................ G01N 35/1009 422/500
8,875,942 B2 11/2014 Poliner
11,688,223 B2 6/2023 Poliner et al.
11,861,969 B2 1/2024 Poliner et al.
2001/0048000 A1 * 12/2001 Arai ........................ G07F 11/62 221/133
2003/0030539 A1 * 2/2003 McGarry ................ G07F 9/002 340/5.9
2003/0146233 A1 * 8/2003 Chirnomas ........... G07F 11/165 221/123
2004/0026441 A1 * 2/2004 Chirnomas ............. G07F 11/14 221/92
2004/0026446 A1 * 2/2004 Mori ....................... G07F 11/14 221/281
2004/0188455 A1 * 9/2004 Shioya .................... G07F 11/32 221/123
2005/0143857 A1 * 6/2005 Chirnomas ............. G07F 11/04 700/244
2005/0279759 A1 * 12/2005 Chirnomas ......... G07F 11/1657 221/211
2006/0191950 A1 * 8/2006 Chirnomas ............. G07F 11/14 221/123
2006/0217836 A1 9/2006 Poliner
2007/0021866 A1 * 1/2007 Coppola ................. G07F 11/10 700/231
2007/0106422 A1 * 5/2007 Jennings ................ B25J 9/0084 222/129.1
2007/0108221 A1 * 5/2007 Mosey ................ G07F 17/0071 221/150 R
2007/0110855 A1 * 5/2007 Mosey ................. B65D 77/245 426/106
2008/0021595 A1 * 1/2008 Chirnomas ............. G07F 11/04 221/92
2008/0093371 A1 * 4/2008 Ubidia ..................... B25J 9/041 901/14
2008/0164279 A1 * 7/2008 Chirnomas ............. G07F 11/04 221/123
2009/0057093 A1 * 3/2009 Iwami ................... G07F 19/202 194/206
2010/0102078 A1 * 4/2010 Mosey ................ G07F 11/1657 312/401
2010/0125515 A1 * 5/2010 Aso ........................ G06Q 40/00 705/35
2016/0180632 A1 * 6/2016 Santana .............. G07F 17/0042 700/238
2018/0238960 A1 * 8/2018 Fu ...................... G01R 31/2887
2021/0272259 A1 * 9/2021 Poliner ................. G07F 11/165
2021/0272409 A1 * 9/2021 Poliner ................. G07F 11/165
2022/0063914 A1 * 3/2022 Langen ................ B65G 1/0464
2022/0157111 A1 * 5/2022 Poliner ................... G07F 11/60
2022/0230503 A1 * 7/2022 Cotter ................. G07F 11/1657
2023/0372203 A1 * 11/2023 Niitsuma .............. A61J 7/0084
2025/0103015 A1 * 3/2025 Mckinley ............... G01N 35/04

OTHER PUBLICATIONS

European Patent Office, Extended Search Report isued in EP 22738331.2-1218, dated Apr. 10, 2024 (8 pages).
Zhu Lei; First Office Action issued in CN Pat. App. No. 202280018286.9; Jul. 10, 2025; 26 pages, including partial machine translation.

* cited by examiner

AUTOMATED DISPENSER FOR GARMENTS AND OTHER ARTICLES AND ASSOCIATED METHODS

This claims the benefit of U.S. Provisional Patent Application Ser. No. 63/138,582, filed Jan. 18, 2021 and hereby incorporated by reference in its entirety.

BACKGROUND OF THE INVENTION

This invention relates to machines for vending or dispensing discrete articles, and more particularly relates to an apparatus and a method for vending articles such as scrub garments or the like.

Scrub garments are uniforms typically worn by doctors, nurses, and other medical workers in hospital operating rooms or other locations where the workers are likely to be in immediate proximity with patients. These scrub garments are hereafter called "scrubs". Scrubs provide an easily-changed launderable barrier between the wearer and the patient, helping to prevent the patient from exposure to germs or infectants on the wearer's body or street clothing, and also helping to protect the wearer's body from direct physical contact with a patient.

Scrubs usually are two-piece garments, consisting of a top or shirt and a bottom or pants. The tops and bottoms are stocked in different sizes to accommodate the needs of individual wearers. Scrub jackets also are worn by doctors and others. Soiled scrubs are collected for laundering and subsequent reuse, but scrubs must be periodically replaced due to wear and tear encountered in normal use as well as the effects of repeated launderings using the high temperatures and detergents required to clean and sterilize the soiled scrubs.

Hospitals normally make scrubs available to doctors and other medical workers at no direct cost to those users. Although each user is supposed to have only a limited number of scrubs at any given time for his or her personal use, some users will hoard scrubs of their size to maintain their own personal reserve. Other users may appropriate extra sets of scrubs for their own personal use, at home or elsewhere outside the hospital. These and other improper uses of scrubs contribute to an unacceptable shrinkage in the inventory of scrubs maintained by the institution for use by authorized persons.

This inventory problem is aggravated by careless handling when scrubs are stacked for use by anyone, some people will withdraw a scrub from within the pile instead of removing the scrub at the top of the pile. This action often inadvertently dumps one or more clean scrubs from the pile onto the floor. That scrub must be relaundered before use, thereby reducing the remaining useful life of the scrub without the benefit of its use before relaundering. Both the shrinkage of the scrub inventory and the need for relaundering scrubs due to careless handling increases the cost of providing and maintaining a sufficient supply of scrubs.

Some hospitals try to control the distribution of scrubs by requiring users to check out scrubs from personnel at central locations. Using this approach, each authorized individual is permitted to have no more than a certain number of scrubs in his or her possession at any time. The individual must return soiled scrubs to receive credit for clean scrubs. Although this approach can alleviate the problems mentioned above, it is expensive to maintain. Many hospitals are large enough to require several scrub-dispensing locations throughout the hospital. Furthermore, because hospitals never close, scrub dispensing locations must be staffed around the clock. The direct and indirect labor costs of that staffing add significantly to the overall cost of maintaining an adequate inventory of scrubs.

It has been proposed to overcome the foregoing problems by dispensing scrubs from a vending machine. However, the kinds of vending machines currently available in the art, and the nature of articles such as scrubs, have limited the practicality of vending machines as a solution to those problems. Most current vending machines operate on the principle that the items being dispensed are held on a shelf awaiting dispensing. The individual items then are pushed to the edge of the shelf and allowed to fall to the bottom of the machine. A door in the bottom allows access to the dispensed item by the user. The disadvantages of such machines are that they are relatively large in depth because of the space required to store the products on shelves and to allow room for free fall to the bottom of the machine. That free fall space also detracts from volume in the machine that otherwise could hold a larger inventory of scrubs. The overall size of the vending machine is particularly important in hospital applications because such machines used for vending scrubs may be placed in hallways or other locations not sized to receive conventional vending machines.

Another common kind of vending machine is the so-called pinwheel machine. The items being vended are received in compartments on a pinwheel or carousel within the machine, and each item is given access to an exit door by turning the pinwheel to place the item in front of that door. These machines also have a size disadvantage because at least two dimensions of the machine (for example, depth and width) must be the same to accommodate the round pinwheel.

The nature of scrubs themselves compounds the difficulty of dispensing those goods through a conventional vending machine. Most vending machines dispense discrete articles having a fixed and unchanging physical size or shape. For example, beverage cans or bottles, cigarette packages, and candy bars each have relatively fixed and rigid shapes that allow handling those articles by the mechanism of a vending machine. Scrubs, in contrast with most other discrete articles dispensed by a vending machine, are relatively soft folded garments that are not within a rigid package. Due to the relative flexibility and low mass of scrubs, they are not readily vendable by machines that move or transport the goods from a storage location to an access door.

One example of a vending or dispensing device for hospital garments of this type is described in U.S. Pat. No. 5,628,985 which is incorporated by reference herein in its entirety. The device disclosed in that patent attempts to accommodate the fact that hospital garments are cloth and not all the same size by placing clean garments in each of various slot-like compartments, and then employing a system of doors to permit customer access to the compartments to obtain the garments. The scrub dispensing system of that patent has 120 fixed and separate compartments, and each is to contain a top and a bottom folded together. This makes it impossible to obtain just the top or just the bottom, if only one garment becomes soiled and needs to be replaced after a procedure. If it is desired to provide a mixed-size scrub suit where the top and bottom are of different sizes, the laundry attendant would have to load this unusual combination specifically into a slot in the machine. Consequently, mixed sizing of scrubs is difficult logistically and is a major problem to satisfy. Also, to access the slots, there is a system of eight outer doors that each extend across the front of the machine from top to bottom, and a system of vertical extrusions behind them that are movable to provide access to a single slot at a time. Thus, for some customers, it is necessary to reach high to an upper slot, or to bend down to a low slot to obtain scrubs. The unit has a card reader or badge reader associated with it to permit customer access, and also has a keypad for entry of customer data and can be connected to a laundry network to provide data about customer activity and scrub dispenser status.

Another prior attempt to solve some of the problems with prior art dispensing systems is disclosed in U.S. Pat. No. 7,474,938, which is incorporated by reference herein in its entirety. The system of that patent is an automated article dispensing device for dispensing articles to a plurality of users includes a garment storage compartments arranged in a plurality of tiers and an article delivery system configured to retrieve a top-most article from at least one the stack and deliver the article to a dispensing outlet. The article delivery system includes a plurality of article retrieval systems equal in number to the number of tiers of the storage compartments.

It was desired to create a scrubs dispense cabinet with at least the additional advantages of increased capacity and dispensing rate, simplicity of design, and to be able to dispense scrub tops and bottoms separately. Moreover, a dispensing system which is more compact and has higher storage capacity than known dispensers is also desired.

SUMMARY OF THE INVENTION

These and other shortcomings in the prior art have been addressed by this invention which in various embodiments includes a dispenser for scrubs or other items. While this invention is described and shown herein dispensing scrubs, other clothing, textile or any item may be dispensed from it. The dispenser according to various embodiments of this invention is modular in that it can be configured with a desired number of cells for storing items and dispensing them accordingly. Additionally, the dispenser of this invention is more compact than prior dispensers thereby requiring a smaller footprint in the hospital or other setting where floor space is often at a premium. Moreover, the dispenser of this invention has fewer moving parts than prior dispensers thereby lessening the likelihood of malfunctions, downtime and unexpected maintenance. Another advantage of the dispenser according to this invention is the ability to dispense the items quickly and efficiently with multiple, simultaneous delivery of items to a user or operator. Further, the dispenser of this invention is modular and can be tailored to a specific requirement and later modified to house and dispense a larger number of items as needed.

These and other advantages of the dispenser according to embodiments of this invention are achieved by a main or primary bank of cells with each cell housing an inventory of multiple items for dispensing. In one embodiment, each cell houses 100 scrubs and each bank contains four cells so each bank has an inventory of up to 400 scrubs for dispensing. Each cell may house a specific item type (top, bottom, coat, etc.) of designated size (XS, S, M, L, XL, XXL, etc.). The main bank of four cells may operate in a standalone manner to dispense items, or additional banks can be added to the main bank for increased inventory capacity. In one embodiment, the dispenser may include multiple banks with four cells in the main bank, eight cells with one bank added to the main bank, twelves cells with two banks serially added to the main bank, sixteen cells with three banks serially added to the main bank, and so on.

The items are stored in a vertical stack in each cell with the uppermost item in the cell being the next item in that cell to be dispensed. In various embodiments, the cells in each bank are arranged in a square or quadrangular arrangement. A pair of pickers each translate along a gantry to be selectively positioned above one of the cells for picking via a suction mechanism or a mechanical picking mechanism to pull the uppermost item in the cell and elevate it out of the cell. The picker on each gantry services two of the cells in the bank. The pickers may operate simultaneously to pick and dispense multiple items at the same time. Each cell includes a platform supporting the vertical stack of items. The platform is moved vertically by an elevator mechanism to always position the upper most item in the cell at the top of the cell for convenient retrieval by the associated picker.

Once picked, the item is moved by the picker along the gantry to a discharge position in the main bank over a discharge delivery chute. When the picker moves into position over the chute in the main bank, it releases the item which falls onto the chute and is directed by gravity or otherwise toward a delivery port in the dispenser for retrieval by the user or operator. When additional banks are added to the main bank, the gantries are extended or replaced with appropriately sized gantries to cover all of the banks in the configured dispenser. While the horizontal travel of the pickers along the gantries is dependent upon the number of banks in the dispenser, the vertical travel of each picker to pick the topmost item in the appropriate cell is constant and minimized to allow for quicker and more efficient retrieval of the items from the stacks of items in the cells.

In various embodiments of the dispenser of this invention, items are dispensed in a quicker and more efficient manner from a dispenser housing a larger inventory of items in a smaller footprint than known dispensers.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
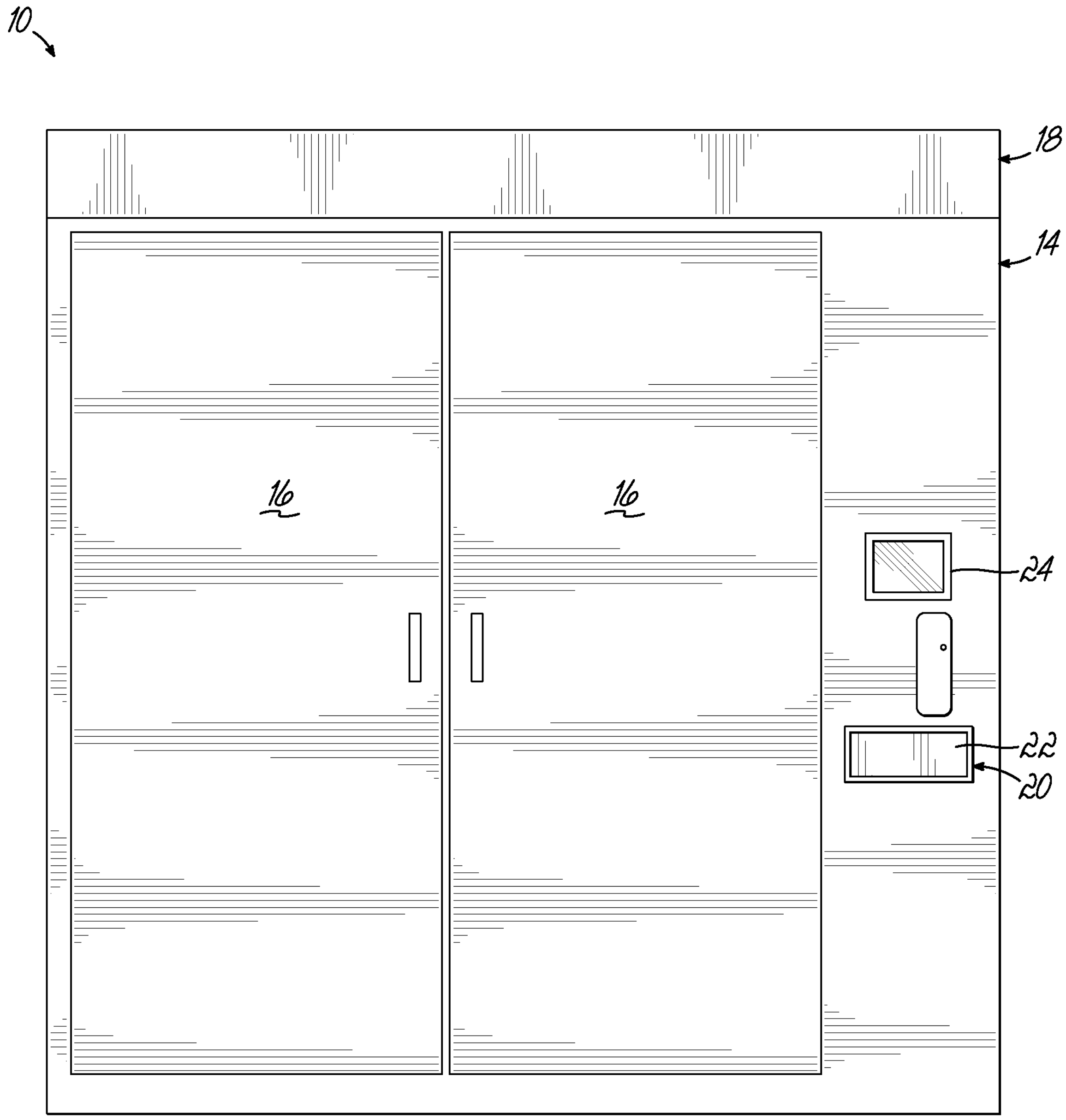
FIG. 1 is a front elevational view of a dispenser according to one embodiment of this invention.

Referring to FIGS. 1-6, one embodiment of a dispenser 10 according to this invention is shown. The dispenser 10 is shown and described herein dispensing folded and packaged scrubs 12, but one of ordinary skill in the art will appreciate that other garments, items or products may be dispensed from various embodiments of this invention and this invention is not limited to dispensing scrubs 12. The dispenser 10 has an exterior cabinet 14 with a base 15 and a pair of doors 16 for selectively closing and opening the cabinet 14 to conceal and expose, respectively, the interior of the dispenser 10. A picker module 18 sits atop the cabinet 14 to retrieve the scrubs 12 and deliver them ultimately to a dispenser port 20 in the cabinet 14 which is selectively closed and opened by a dispenser door 22 through which a user may retrieve the scrubs 12 being dispensed. A control panel 24 may be in the form of an HMI/user interface as appropriate is also provided on the cabinet 14 for operation and programming of the dispenser 10.

Figure 2:
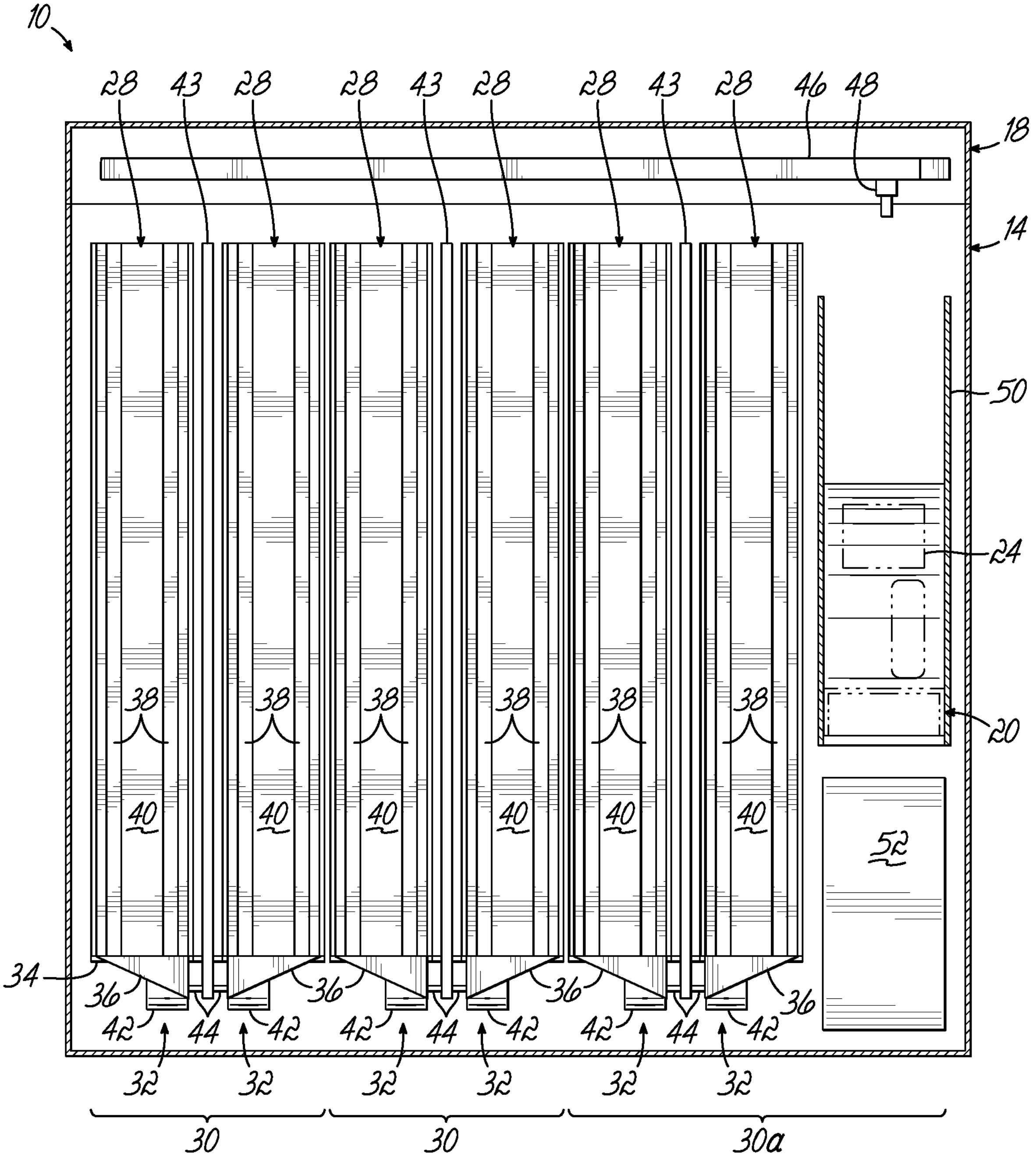
FIG. 2 is a view similar to FIG. 1 with a front of a cabinet housing of the dispenser removed to show dispenser components therein.
Figure 6:
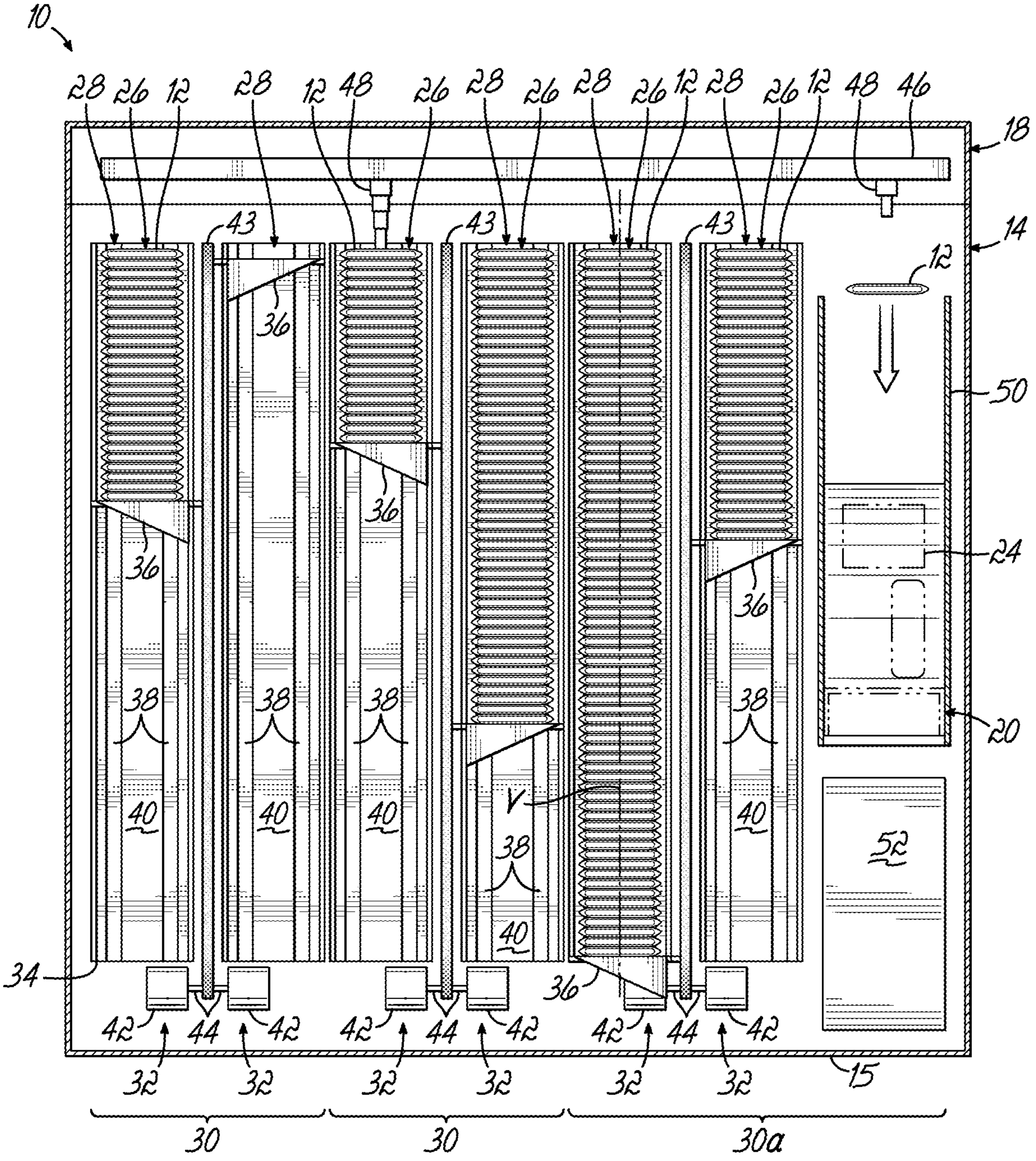
FIG. 6 is a view similar to FIG. 2 with scrubs housed in cells of the dispenser being retrieved and dispensed.

The dispenser 10 embodiment of FIG. 1 is also shown in FIGS. 2-6 with various portions of the cabinet 14 and/or the picker module 18 removed to better show the components of the dispenser 10. FIGS. 2 and 6 are similar views of the front of the dispenser 10 with FIG. 6 including a supply of scrubs 12 housed in the dispenser 10. The scrubs 12 are arranged in discrete vertical stacks 26 having a vertical axis V in individual storage cells 28 arranged in blocks 30 in the dispenser 10. According to various embodiments of this invention, the dispenser 10 is modular and can be selectively configured to house a range of quantities of scrubs 12 depending upon the current and/or future needs of the institution or environment in which the dispenser 10 is utilized. Moreover, in various embodiments of this invention, each cell extends substantially the full height of the dispenser beneath the picker module so as to maximize the capacity of the dispenser and minimize its footprint in the hospital or other setting.

The modularity of the dispenser 10 of various embodiments of this invention is derived from the capability of adding blocks 30, as needed, to the dispenser 12. Each block 30 contains four cells 28 with each cell 28 having a longitudinal, generally vertical axis parallel with the vertical, longitudinal axes of the other cells 28. Each cell 28 may contain one vertical stack 26 of scrubs 12 to be dispensed according to various embodiments of this invention. The dispenser 10 shown in FIG. 5 includes three banks 30 of a total of twelve cells 28 of stacks 26 of scrubs 12. The cells 28 in each bank **3*o* are arranged in a square or quadrangular arrangement. Each dispenser 12 according to embodiments of this invention includes a main bank 30*a* which includes the control panel 24, dispenser port 20, dispenser door 22 and appropriate power, command and control, communication and operational components of the dispenser 12 as will be appreciated by one of ordinary skill in the art. In one embodiment of this invention, each cell may contain approximately one hundred packaged scrubs 12 in the four stack 26, so each bank 30 of four cells 28 may hold four hundred packaged scrubs 12 in four stacks 26. An encoder (not shown) may be included on each cell 28 to provide a real-time inventory of the scrubs 12 in the respective cell 28. Additional banks 30 may be coupled to the main bank 30*a* to add approximately four hundred packaged scrubs 12 per added bank 30. The dispenser 10 of FIGS. 1-6 has a total of three banks 30 including the main bank 30*a* and two additional banks 30 with a capacity of housing about 1,200 total packaged scrubs 12 in the dispenser 10**.

As shown in FIGS. 2-6, each cell 28 may have an elevator mechanism 32 which supports and raises the stack 26 of scrubs 12 from a base 34 toward a top end of the cell 28. The scrubs 12 in each stack 26 are supported on a platform 36 which translates vertically by the elevator mechanism 32 along pairs of vertical guides 38 in a frame member 40. Each platform 36 is coupled to a driver 42 which translates vertically to move the platform 34 in the cell 28. The driver 42 is coupled to a belt 43 and an actuator 44 at the bottom end of the cell 28 for movement. The actuator 44 may be a clutch based system, servomotor or other device for selective movement of the driver 42 and platform 34 to keep the uppermost scrub 12 at the top of the cell 28 as shown in FIG. 6.

Figure 3:
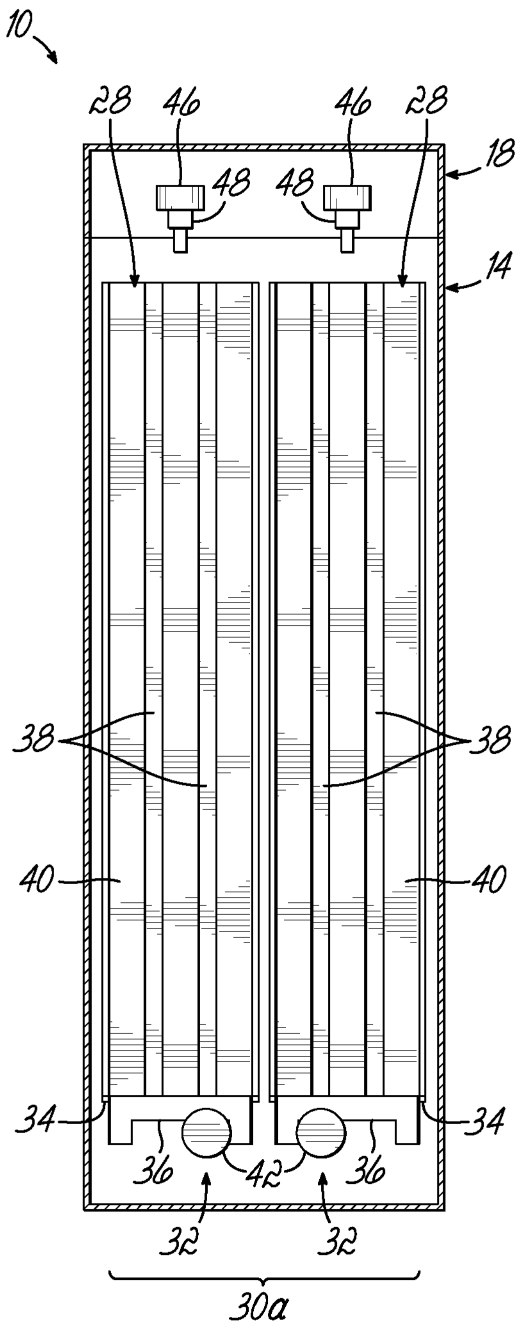
FIG. 3 is a left side elevational view of the dispenser of FIGS. 1-2 with a portion of the cabinet housing removed to show dispenser components therein.
Figure 4:
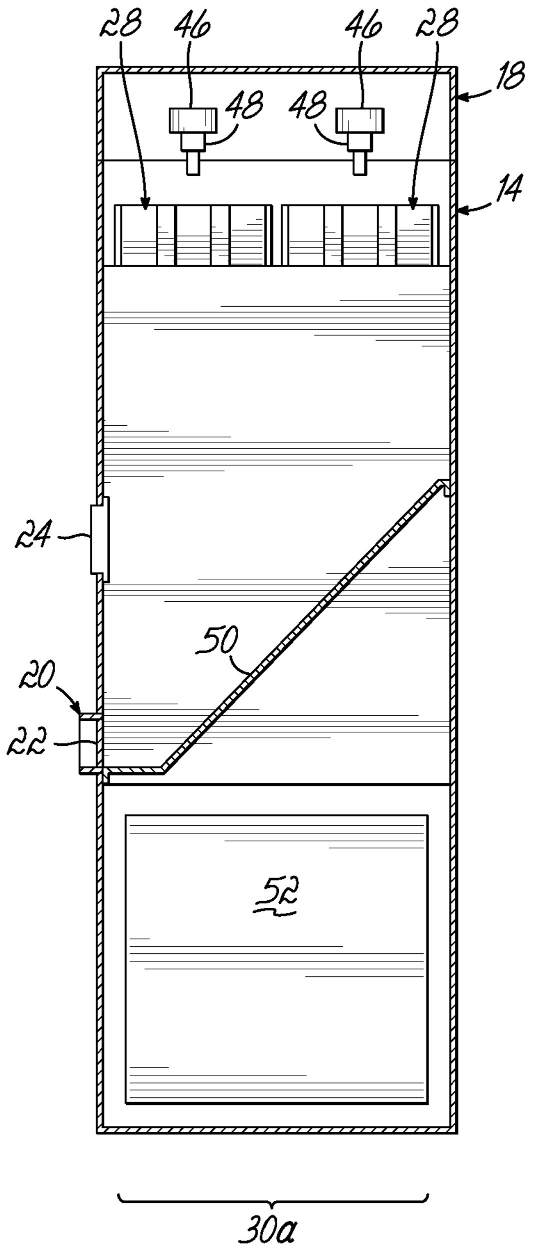
FIG. 4 is a right side elevational view of the dispenser of FIGS. 1-3 with a portion of the cabinet housing removed to show dispenser components therein.
Figure 5:
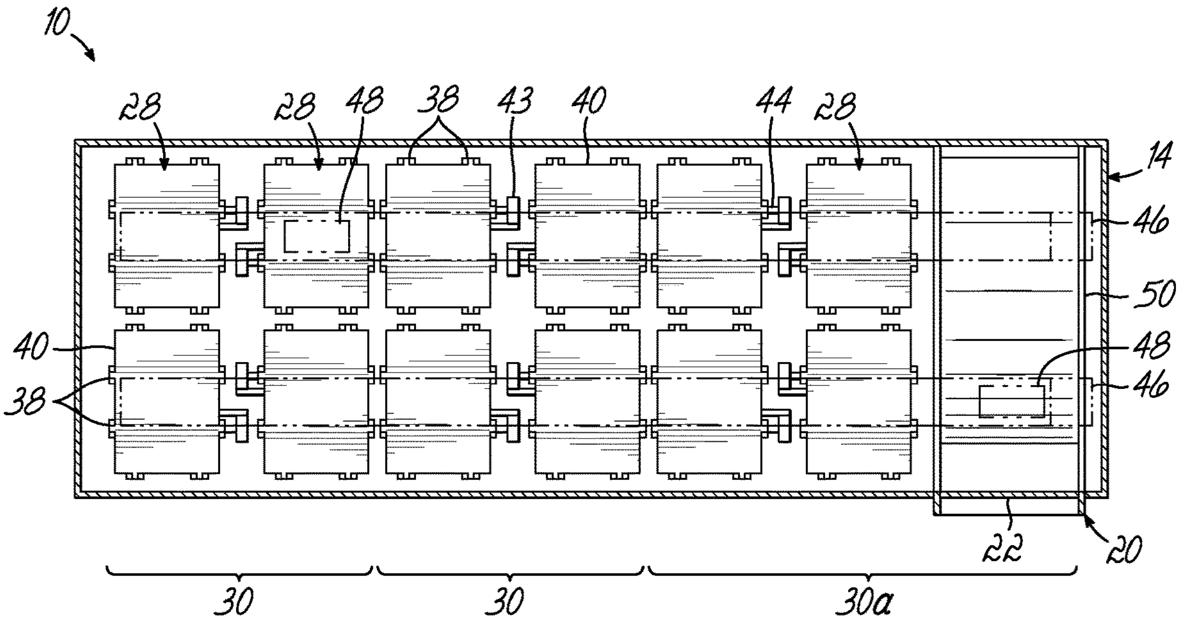
FIG. 5 is a top view of the dispenser of FIGS. 1-4 with a portion of the cabinet housing removed to show dispenser components therein.

The dispenser 10 includes the picker module 18 situated atop the cabinet 14. The picker module 18 is sized and configured according to the number of banks 30 in the dispenser 10 as the picker module 18 services all of the banks 30 and associated cells 28 in the dispenser 10. The picker module 18 includes a pair of parallel gantries 46 extending across the tops of the banks 30 and associated cells 28 as shown in FIGS. 2-4. Each gantry 46 includes an end effector as a picker 48 which is mounted for horizontal translation along the associated gantry 46 to service two of the longitudinally aligned cells 28 in each bank 30. The picker 48 may be driven by a belt actuator, servomotor or other device for selective movement along the associated gantry 46 to pick a selected scrub 12 from the top of the designated cell 28 and delivery of the scrub 12 to the main bank **30*a* to be released and deposited onto a dispenser chute 50 for gravity feed of the scrub to the dispenser port 20 for retrieval by the user. The end effector picker 48 according to various embodiments of this invention may be a suction or pneumatic device, particularly if each scrub 12 is packaged in a plastic, cellophane or other material which forms a seal with a suction head of the picker 48. Alternatively, a mechanical picker to mechanically grasp the scrub 12 or other picker device may be used within the scope of this invention. The multiple pickers 48 in the picker module 18 may operate simultaneously to pick, move and deposit scrubs 12 to the chute 50 for delivery to the user and this mode of operation is particularly advantageous to provide more efficiency and higher dispensing rates to the dispenser 12 compared to known dispensers. It is estimated that certain embodiments of this invention may dispense scrubs 12** at a rate of two scrubs every five seconds.

As shown most clearly in FIG. 4, a control module 52 may be located beneath the chute 50 in the main bank 30*a* for housing the appropriate control systems and components for operation of the dispenser 12 as would be understood by one of ordinary skill in the art.

Figure 7:
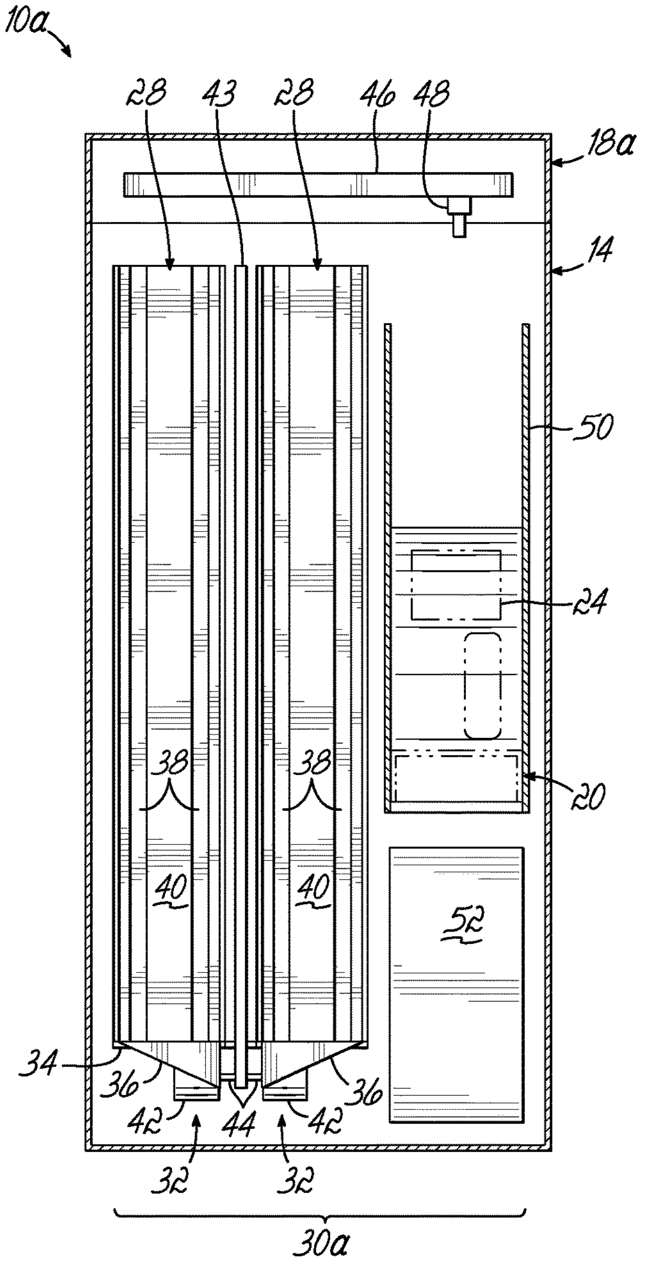
FIG. 7 is a front elevational view of another embodiment of a dispenser of this invention including a main bank of cells for storing scrubs with a front cabinet housing of the dispenser removed to show dispenser components therein.
Figure 8:
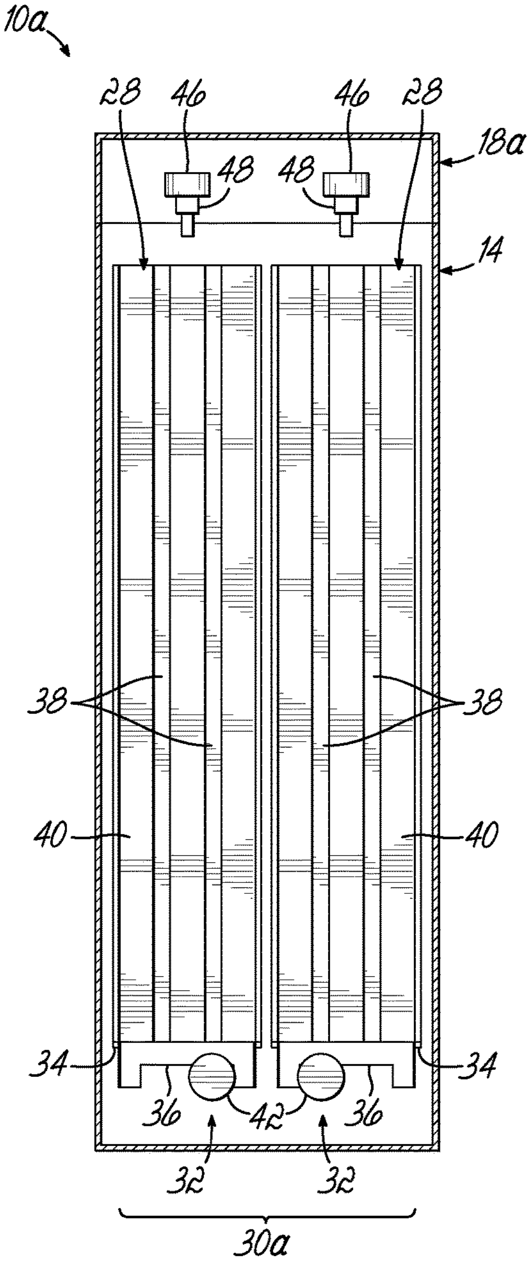
FIG. 8 is a front elevational view of an embodiment of a bank of cells for storing scrubs with a front cabinet housing of the dispenser removed to show dispenser components therein.
Figure 10:
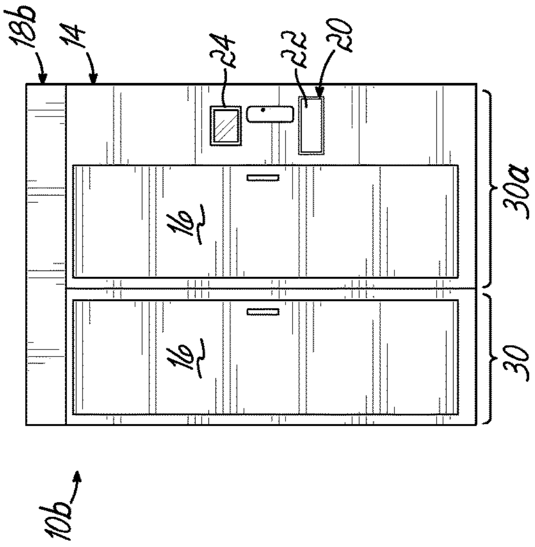
FIG. 10 is a front elevational view of a dispenser of this invention with a main bank and additional bank of cells according to one embodiment.
Figure 11:
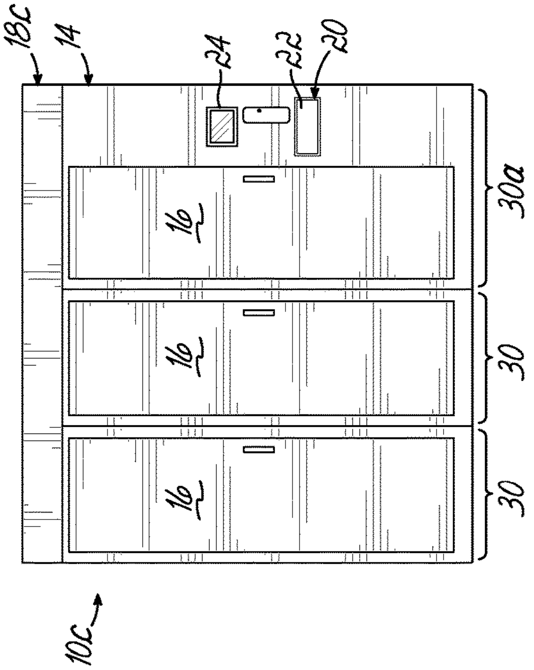
FIG. 11 is a front elevational view of a dispenser of this invention with a main bank and two additional banks of cells according to one embodiment of this invention.
Figure 9:
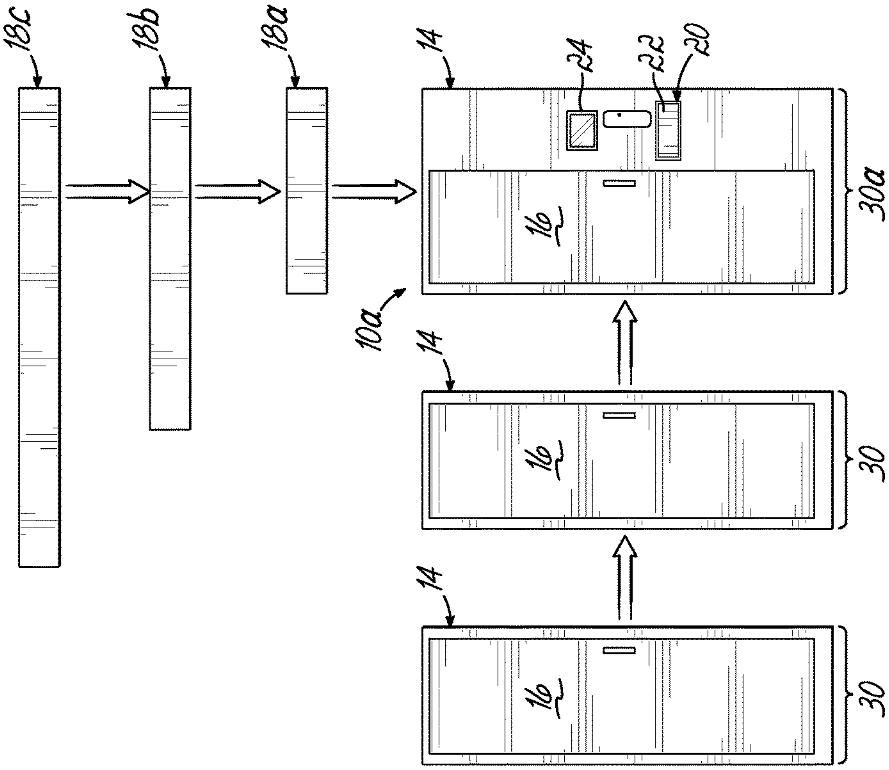
FIG. 9 is a front elevational view of a main bank and optional one or two additional banks of cells forming a dispenser of four, eight or twelve cells according various embodiments of this invention.

In FIGS. 7-8, an alternative embodiment of a dispenser 10*a* according to this invention is shown in which the main bank 30*a* of four cells 28 is included. The picker module 18*a* of the dispenser 10*a* of FIGS. 7-8 has dual gantries 46 and dual pickers 48 and extends only over the cells 28 and chute 50 of the main bank 30*a* of the dispenser 10*a*. FIG. 9 demonstrates the modularity of the dispenser 10 according to various embodiments of this invention and includes the dispenser 10*a* and picker module 18*a* of FIGS. 7-8 as well as an added bank 30 and accompanying picker module 18*b* for the eight cells 28 of the two bank dispenser 10*b* along with a third bank 3*o* forming a dispenser 10*c* and associated picker module 18*c* for the twelve cells 28 of the three bank 30 dispenser 10*c*. Front elevational views of the two bank dispenser 10*b* and three bank dispenser 10*c* are shown in FIGS. 10-11, respectively, with the associated picker modules 18*b* and 18*c*, respectively. The dispenser of this invention is not limited to any particular number of cells, banks or scrubs and may be configured as needed for the environment in which it is utilized. The cabinet 14 for each of the dispenser embodiments may include a door 16 for each bank 30 or doors 16 covering more than one bank 30 as desired.

In the embodiment of the dispenser 10 shown in FIGS. 1-6 which includes three banks 30, the dispenser 10 may measure 88 inches tall, 30 inches deep and 88 inches wide with each bank 30 measuring 70 inches tall. This invention provides a dispenser which requires a small footprint, has more inventory capacity and a higher dispensing rate than other known scrub dispensers. The scrubs are stored in a single tier in the various cells and the picking operation is more efficient and quicker, in part, by virtue of the elevator mechanism which maintains the available inventory at the top of the respective cells for convenient access by the dual and simultaneous picker design.

Figure 12:
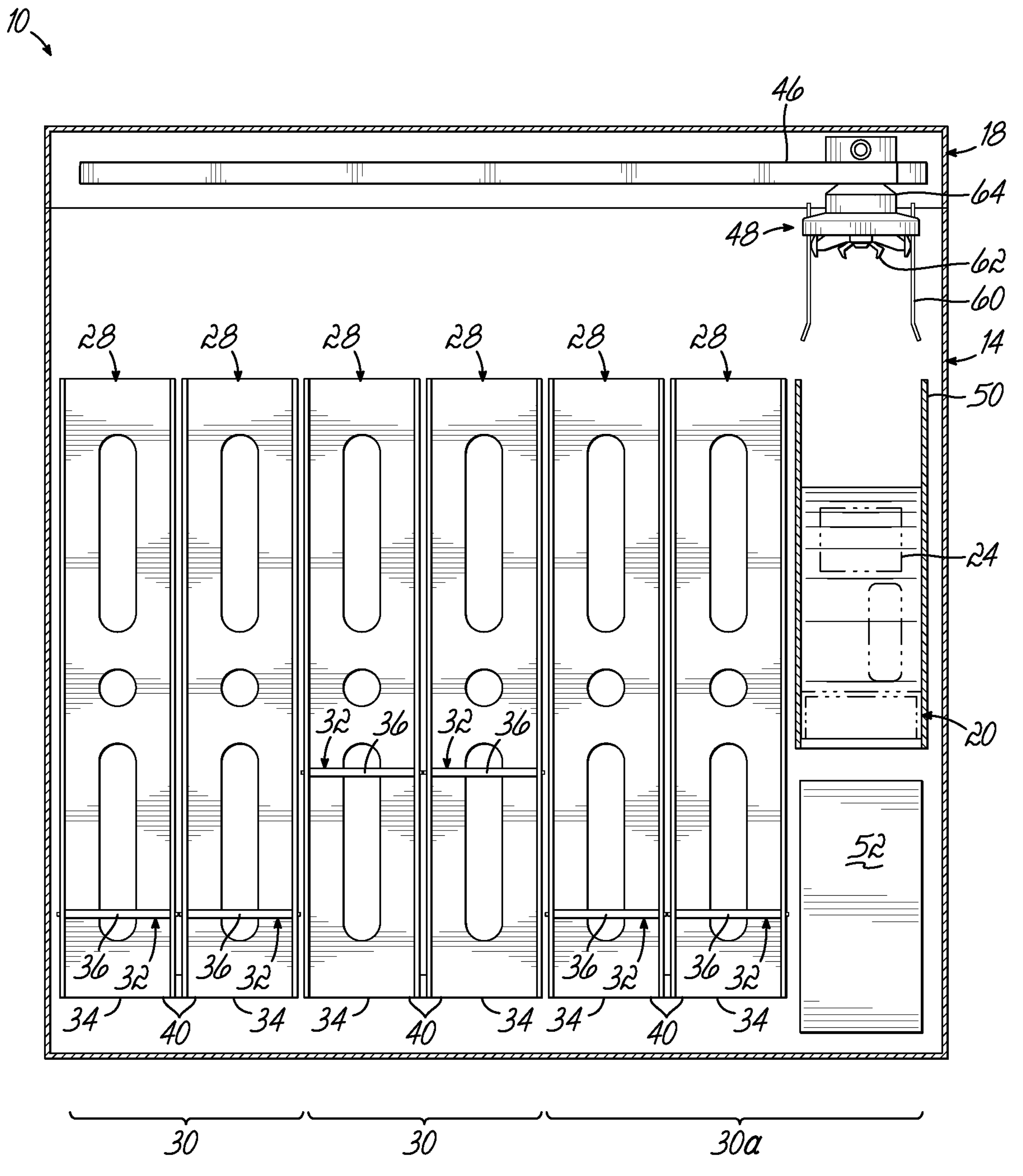
FIG. 12 is a front elevational view of a dispenser according to another embodiment of this invention with the front of the cabinet removed to reveal the interior of the dispenser.
Figure 13:
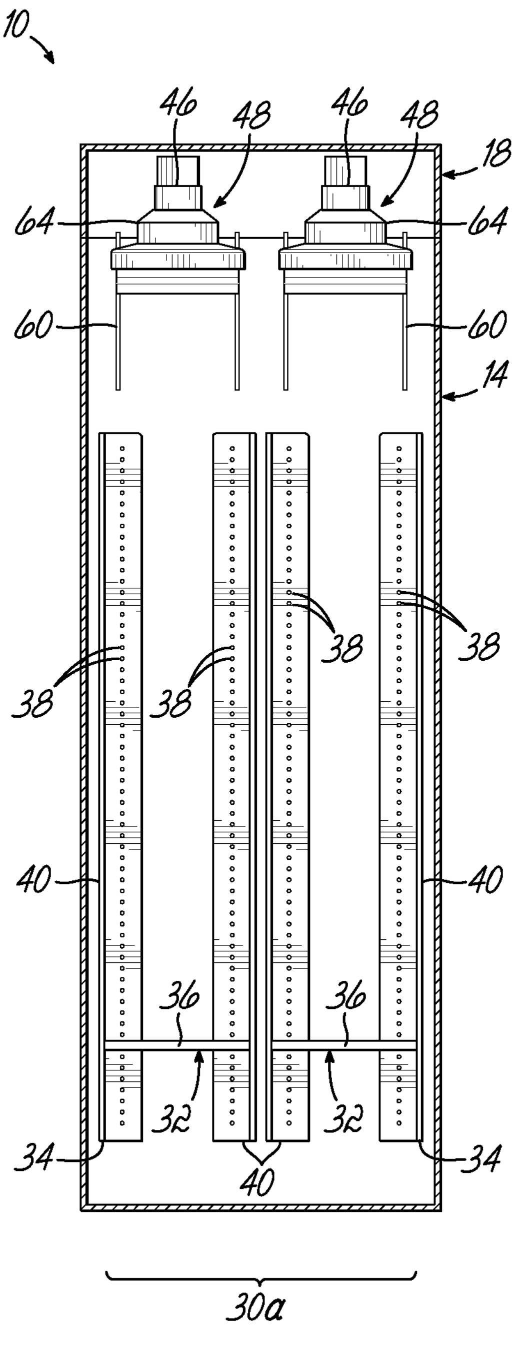
FIG. 13 is a left side elevational view of the dispenser of FIG. 12 with a portion of the cabinet housing removed to show dispenser components therein.
Figure 14:
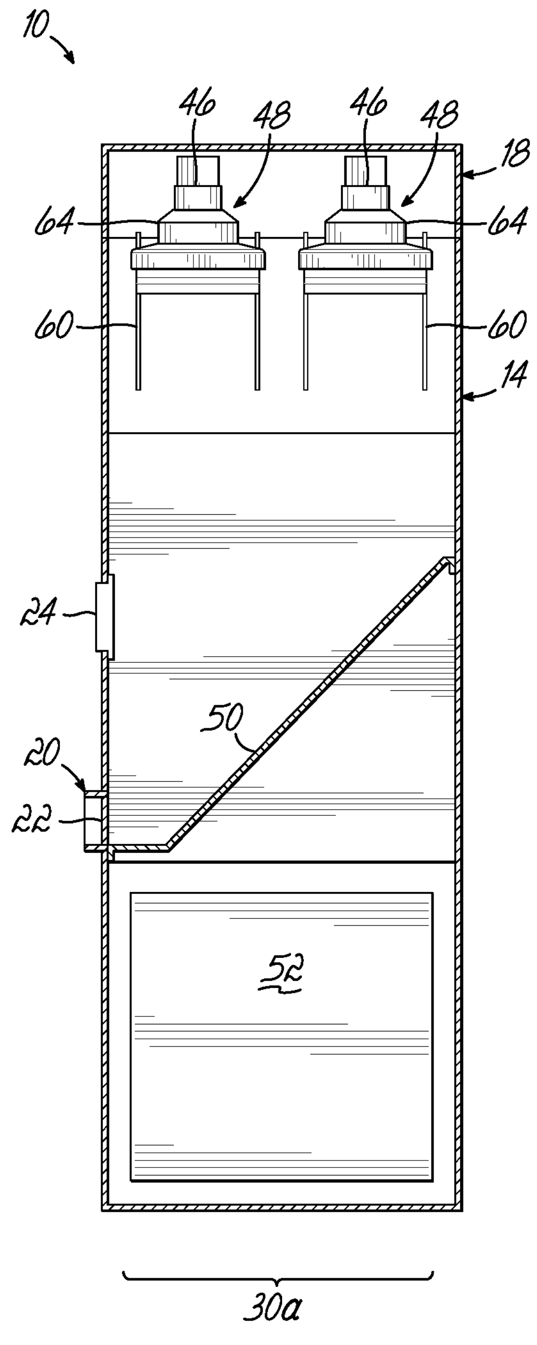
FIG. 14 is a right side elevational view of the dispenser of FIGS. 12-13 with a portion of the cabinet housing removed to show dispenser components therein.
Figure 15:
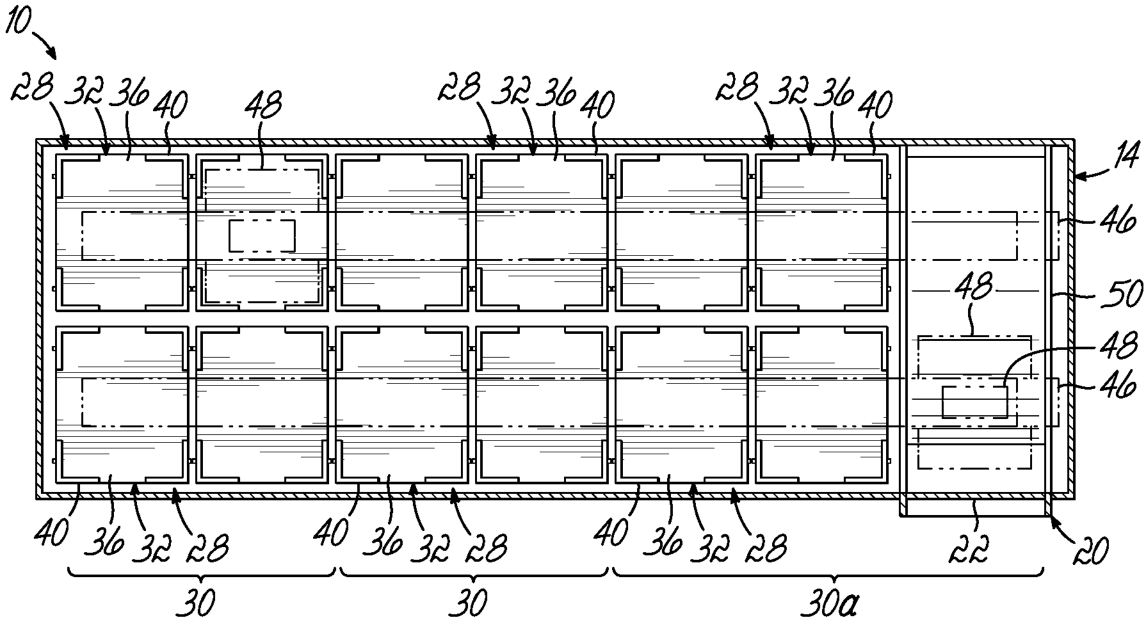
FIG. 15 is a top view of the dispenser of FIGS. 12-14 with a portion of the cabinet housing removed to show dispenser components therein.

A further alternative embodiment of the dispenser according to this invention is shown in FIGS. 12-16 with similar components bearing the same reference numeral as those components of other embodiments of this invention shown and described herein. Referring to FIG. 12, the dispenser 10 according to this embodiment is shown. The dispenser 10 is shown and described herein dispensing folded and packaged scrubs 12, but one of ordinary skill in the art will appreciate that other garments, items or products may be dispensed from various embodiments of this invention and this invention is not limited to dispensing scrubs 12. The dispenser 10 has an exterior cabinet 14 and a pair of doors (not shown) for selectively closing and opening the cabinet 14 to conceal and expose, respectively, the interior of the dispenser 10. A picker module 18 sits atop the cabinet 14 to retrieve the scrubs 12 and deliver them ultimately to a dispenser port 20 in the cabinet 14 which is selectively closed and opened by a dispenser door 22 through which a user may retrieve the scrubs 12 being dispensed. A control panel 24 may be in the form of an HMI/user interface as appropriate is also provided on the cabinet 14 for operation and programming of the dispenser 10.

Figure 16:
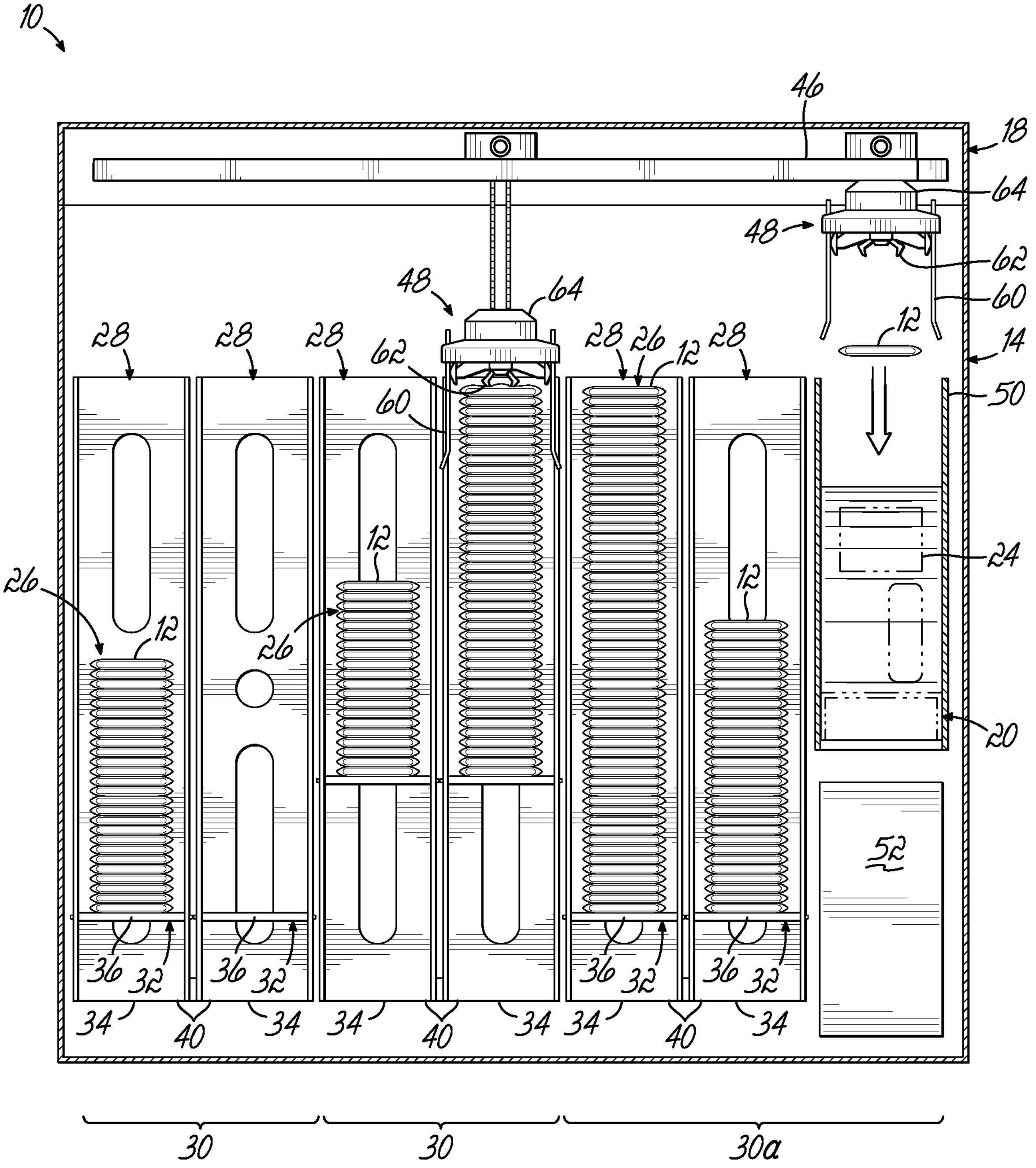
FIG. 16 is a view similar to FIG. 12 with scrubs housed in cells of the dispenser being retrieved and dispensed.

The dispenser 10 embodiment of FIG. 12 is also shown in FIGS. 13-16 with various portions of the cabinet 14 and/or the picker module 18 removed to better show the components of the dispenser 10. A supply of scrubs 12 housed in the dispenser 10 is shown in FIG. 16. The scrubs 12 are arranged in discrete vertical stacks 26 in individual cells 28 arranged in banks 30 in the dispenser 12. According to various embodiments of this invention, the dispenser 10 is modular and can be selectively configured to house a range of quantities of scrubs 12 depending upon the current and/or future needs of the institution or environment in which the dispenser 10 is utilized.

The modularity of the dispenser 10 of various embodiments of this invention is derived from the capability of adding blocks 30, as needed, to the dispenser 12. Each block 3*o* may contain four cells 28 with each cell 28 having one vertical stack 26 of scrubs 12 to be dispensed according to various embodiments of this invention. The block 30 may contain another quantity of cells 28 within the scope of this invention. The dispenser 10 shown in FIG. 15 includes three banks 30 of a total of twelve cells 28 of stacks 26 of scrubs 12. The cells 28 in each bank 30 are arranged in a square or quadrangular arrangement, but other arrangements are within the scope of this invention. Each dispenser 12 according to embodiments of this invention includes a main bank 30*a* which includes the control panel 24, dispenser port 20, dispenser door 22 and appropriate power, command and control, communication and operational components of the dispenser 12 as will be appreciated by one of ordinary skill in the art. In one embodiment of this invention, each cell may contain approximately one hundred packaged scrubs 12 in the four stack 26, so each bank 30 of four cells 28 may hold four hundred packaged scrubs 12 in four stacks 26. An encoder (not shown) may be included on each cell 28 to provide a real-time inventory of the scrubs 12 in the respective cell 28. Additional banks 30 may be coupled to the main bank 30*a* to add approximately four hundred packaged scrubs 12 per added bank 30. The dispenser 10 of FIGS. 12-16 has a total of three blocks 30 including the main bank 30*a* and two additional banks 30 with a capacity of housing about 1,200 total packaged scrubs 12 in the dispenser 10.

As shown in FIG. 16, each storage cell 28 may have an elevator mechanism 32 which supports and raises the stack 26 of scrubs 12 from a base 34 toward a top end of the cell 28. The scrubs 12 in each stack 26 are supported on a platform 36 which translates vertically by the elevator mechanism 32 along pairs of vertical guides 38 in a frame member 40. Each platform 36 is coupled to a driver 42 which translates vertically to move the platform 34 in the cell 28. The driver 42 and platform 34 keep the uppermost scrub 12 at the top of the cell 28 as shown in FIG. 16.

The dispenser 10 includes the picker module 18 situated atop the cabinet 14. The picker module 18 is sized and configured according to the number of banks 30 in the dispenser 10 as the picker module 18 services all of the banks 30 and associated cells 28 in the dispenser 10. The picker module 18 includes a pair of parallel gantries 46 extending across the tops of the banks 30 and associated cells 28 as shown in FIGS. 12-16. Each gantry 46 includes a picker 48 which is mounted for horizontal translation along the associated gantry 46 to service two of the longitudinally aligned cells 28 in each bank 30. The picker 48 may be driven by a belt actuator, servomotor or other device for selective movement along the associated gantry 46 to pick a selected scrub 12 from the top of the designated cell 28 and delivery of the scrub 12 to the main bank 30*a* to be released and deposited onto a dispenser chute 50 for gravity feed of the scrub to the dispenser port 20 for retrieval by the user. The picker 48 according to this embodiment of this invention may be claw type mechanism with a picker jaw 62 extending downwardly from a hub 64 of the picker 48. The picker 48 may include a pair of guide arms 6*o* which help to align the picker 48 and picker jaw 62 with the cell 28 when retrieving a packaged scrub 12 or another article. The multiple pickers 48 in the picker module 18 may operate simultaneously to pick, move and deposit scrubs 12 to the chute 50 for delivery to the user and this mode of operation is particularly advantageous to provide more efficiency and higher dispensing rates to the dispenser 10 compared to known dispensers. It is estimated that certain embodiments of this invention may dispense scrubs 12 at a rate of two scrubs every five seconds.

As shown most clearly in FIG. 12, a control module 52 may be located beneath the chute 50 in the main bank 30*a* for housing the appropriate control systems and components for operation of the dispenser 12 as would be understood by one of ordinary skill in the art.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A dispenser for storing and dispensing a plurality of items, the dispenser comprising:

a cabinet;

a plurality of storage cells located in the cabinet and organized in a plurality of linear rows of storage cells, each of the plurality of storage cells extending vertically from a lower end of the cabinet toward an upper end of the cabinet, having a generally vertical axis, and configured for storage of a respective vertical stack of items having a respective topmost item, wherein the topmost item from each of the plurality of storage cells is at a common vertical position relative to a base of the cabinet and atop the respective vertical stacks of items;

at least one dispensing outlet;

an article delivery system configured to retrieve the topmost item from at least two of the plurality of storage cells, where the at least two of the plurality of storage cells are in different linear rows of storage cells, and deliver the topmost items to the dispensing outlet, the article delivery system including a plurality of pickers equal in number to the plurality of linear rows of storage cells and a plurality of gantries equal in number to the plurality of pickers, wherein each of the plurality of pickers is positioned proximate the upper end of the cabinet and movably mounted to a respective one of the plurality of gantries that extends across a respective linear row of storage cells, wherein the plurality of gantries are disposed superjacent to the common vertical position, and wherein the plurality of pickers is operable simultaneously to retrieve the topmost items from the at least two of the plurality of storage cells in different linear rows of storage cells;

a user interface unit accessible to a user of the dispenser; and an on-board processing unit configured to control the article delivery system, the on-board processing unit being in electrical communication with the article delivery system and the user interface unit.

2. The dispenser of claim 1 wherein each of the plurality of pickers is arranged in parallel with one another and situated atop the common vertical position.

3. The dispenser of claim 1 wherein each of the plurality of storage cells includes a respective elevator mechanism configured to vertically raise the items stored therein toward the common vertical position and toward an associated one of the plurality of pickers.

4. The dispenser of claim 1 wherein each of the plurality of pickers is a pneumatic picker or a mechanical picker.

5. The dispenser of claim 1 wherein each of the plurality of gantries is parallel with one another in a horizontal plane.

6. The dispenser of claim 1 further comprising:

a main bank having a first plurality of the storage cells and the user interface; and at least one additional bank having a second plurality of the storage cells and being operably coupled to the main bank;

wherein the article delivery system spans and services the main bank and the at least one additional bank to facilitate retrieval of items from the main bank and the at least one additional bank for delivery to the dispensing outlet.

7. The dispenser of claim 1 wherein:

a first one of the plurality of storage cells contains scrubs of a first size; and a second one of the plurality of storage cells contains scrubs of a second size different from the first size.

8. The dispenser of claim 1 wherein the plurality of storage cells is arranged in only one tier.

9. The dispenser of claim 1, wherein each of the plurality of gantries is positioned directly over and extends substantially the length of the respective linear row of storage cells.

10. The dispenser of claim 3, wherein the elevator mechanism includes an actuator, a belt, and a driver, wherein the driver is coupled to and configured to translate a platform upon which items are raised toward the common vertical position.

11. The dispenser of claim 6, wherein the storage cells in each of the main bank and the at least one additional bank are arranged in a square arrangement.

12. A method for dispensing a plurality of items from a dispenser, the method comprising:

arranging the plurality of items in a cabinet in a plurality of vertical stacks with each of the plurality of vertical stacks being in a respective one of a plurality of discrete storage cells, the plurality of discrete storage cells organized in a plurality of linear rows of storage cells;

simultaneously retrieving from an upper end of the cabinet a first topmost item from a first one of the plurality of vertical stacks disposed in a first storage cell in a first linear row of storage cells and a second topmost item from a second one of the plurality of vertical stacks disposed in a second storage cell in a second linear row of storage cells, and wherein each of the plurality of discrete storage cells extends vertically from a lower end of the cabinet toward an upper end of the cabinet; and delivering each of the first and second topmost items to a dispensing outlet of the dispenser to facilitate access by at least one user of the dispenser; wherein the first topmost item is retrieved by a first picker movably mounted to a first gantry extending across the first linear row of storage cells;

the second topmost item is retrieved by a second picker movably mounted to a second gantry extending across the second linear row of storage cells; and the first and second gantries are parallel to each other and disposed superjacent to the plurality of vertical stacks.

13. The method of claim 12, wherein each of the first and second gantries is positioned directly over and extends substantially the length of the respective first and second linear rows of storage cells.

14. The method of claim 12 further comprising:

grouping the plurality of discrete storage cells into a main bank of storage cells and at least one additional bank of storage cells; and operably coupling the main bank of storage cells and the at least one additional bank of storage cells.

15. The method of claim 12 wherein the simultaneously retrieving further comprises:

moving the first picker to a first position above the first topmost item; and moving the second picker to a second position above the second topmost item.

16. The method of claim 12 wherein the delivering further comprises:

moving the first picker holding the first topmost item toward a chute in communication with the dispensing outlet; and moving the second picker holding the second topmost item toward the chute.

17. The method of claim 12 further comprising:

elevating a remainder of the items in the first one of the plurality of vertical stacks; and elevating a remainder of the items in the second one of the plurality of vertical stacks.

18. The method of claim 17 wherein the first and second topmost items and a topmost item in each of a remainder of the plurality of vertical stacks are generally positioned at a same vertical height.

19. The method of claim 17, wherein elevating a remainder of the items in each of the first one of the plurality of vertical stacks and the second one of the plurality of vertical stacks includes vertically raising the respective remainder of items toward the common vertical position with an elevator mechanism, wherein the elevator mechanism includes an actuator, a belt, and a driver.

20. The method of claim 12 wherein each of the plurality of linear rows of storage cells is generally parallel to each other.

21. The method of claim 14 further comprising:

adding a third additional bank of storage cells to the at least one additional bank of storage cells at an end of the dispenser opposite from the main bank of storage cells.

22. The method of claim 14 further comprising:

configuring a picker module positioned atop the main bank of storage cells and the at least one additional bank of storage cells to accommodate both the simultaneously retrieving and the delivering.

23. The method of claim 12 wherein the arranging further comprises arranging the storage cells in only one tier.

24. The method of claim 14, wherein the storage cells in each of the main bank and the at least one additional bank are arranged in a square arrangement.

* * * * *